US010235123B2

(12) United States Patent
Kreitzer et al.

(10) Patent No.: US 10,235,123 B2
(45) Date of Patent: Mar. 19, 2019

(54) APPARATUS AND METHOD FOR TRANSMITTING AND RENDERING AUGMENTED REALITY INFORMATION

(71) Applicant: MOTOROLA SOLUTIONS, INC., Chicago, IL (US)

(72) Inventors: Stuart S. Kreitzer, Coral Springs, FL (US); Jesus F. Corretjer, Weston, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/482,077

(22) Filed: Apr. 7, 2017

(65) Prior Publication Data

US 2018/0293040 A1    Oct. 11, 2018

(51) Int. Cl.
| | |
|---|---|
| G06T 19/00 | (2011.01) |
| G06F 3/147 | (2006.01) |
| G06T 11/60 | (2006.01) |
| G06F 3/048 | (2013.01) |
| G06Q 10/00 | (2012.01) |
| G06Q 50/30 | (2012.01) |
| G08G 1/00 | (2006.01) |
| G06Q 50/26 | (2012.01) |

(52) U.S. Cl.
CPC .............. *G06F 3/147* (2013.01); *G06F 3/048* (2013.01); *G06Q 10/00* (2013.01); *G06Q 50/265* (2013.01); *G06Q 50/30* (2013.01); *G06T 11/60* (2013.01); *G06T 19/006* (2013.01); *G08G 1/00* (2013.01); *G06T 2210/61* (2013.01)

(58) Field of Classification Search
CPC .................................................. G06T 19/006
See application file for complete search history.

(56) References Cited

U.S. PATENT DOCUMENTS

| | | | |
|---|---|---|---|
| 6,502,030 B2 | 12/2002 | Hilleary | |
| 9,191,238 B2 | 11/2015 | Douris et al. | |
| 2013/0044130 A1* | 2/2013 | Geisner | G09G 5/00 |
| | | | 345/633 |
| 2013/0145482 A1* | 6/2013 | Ricci | H04W 4/90 |
| | | | 726/28 |

(Continued)

FOREIGN PATENT DOCUMENTS

KR    20130051374 A    5/2013

OTHER PUBLICATIONS

ISA/EP, International Search Report and Written Opinion, Aug. 21, 2018, re PCT International Patent Application No. PCT/US2018/026175.

*Primary Examiner* — Ryan McCulley

(74) *Attorney, Agent, or Firm* — Perry + Currier, Inc.

(57) ABSTRACT

A method and apparatus for registering, by a first controller associated with a vehicle, at least one information device associated with an occupant when the occupant enters the vehicle. The first controller obtains vehicle information and obtains information associated with each registered occupant from the at least one information device associated with the registered occupant. The first controller transmits the vehicle information and information associated with each registered occupant of the vehicle to an augmented reality viewer, wherein transmitted information is overlaid on an image of the vehicle rendered on the augmented reality viewer.

20 Claims, 8 Drawing Sheets

(56) References Cited

U.S. PATENT DOCUMENTS

| | | | |
|---|---|---|---|
| 2013/0238167 A1* | 9/2013 | Stanfield | G08G 1/20 |
| | | | 701/2 |
| 2014/0063064 A1* | 3/2014 | Seo | G08G 1/166 |
| | | | 345/633 |
| 2014/0172238 A1* | 6/2014 | Craine | B60R 16/037 |
| | | | 701/48 |
| 2014/0225923 A1* | 8/2014 | Huang | G06T 19/006 |
| | | | 345/633 |
| 2015/0166009 A1 | 6/2015 | Outwater et al. | |
| 2016/0378861 A1* | 12/2016 | Eledath | G06K 9/00718 |
| | | | 707/766 |
| 2017/0090850 A1* | 3/2017 | Amrhein | G06F 3/1454 |
| 2018/0059416 A1* | 3/2018 | Bhalla | B60K 37/06 |

\* cited by examiner

APPARATUS AND METHOD FOR TRANSMITTING AND RENDERING AUGMENTED REALITY INFORMATION

BACKGROUND OF THE INVENTION

Public safety vehicles are typically identified with information painted on the vehicles. Examples of public safety vehicles may include police cars, aircraft, fire engines and patrol boats. The identifying information may include the name of an authority, for example, police, highway patrol, sheriff, or fire department, to which a vehicle belongs, and other markings, for example, the jurisdiction in which the named authority operates or emergency numbers associated with the authority.

It may be necessary for public safety officers to obtain more information than that painted on the vehicles. For example, when multiple public safety officers respond to an incident, it may be necessary for the public safety officers to identify in real-time which vehicles are associated with a given authority.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
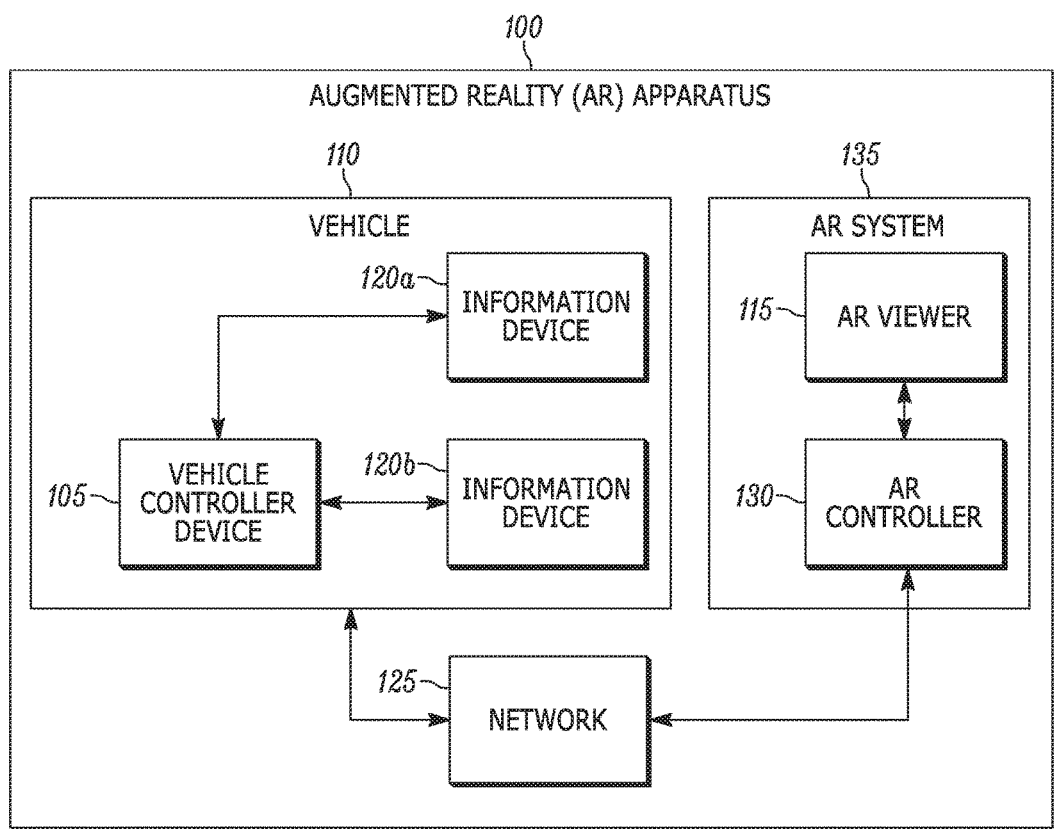
FIG. 1 is a block diagram an augmented reality apparatus used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to apparatuses and method for registering, by a first controller associated with a vehicle, at least one information device associated with an occupant subsequent to the occupant entering the vehicle. The first controller obtains vehicle information and obtains information associated with each registered occupant from the at least one information device associated with the registered occupant. The first controller transmits the vehicle information and information associated with each registered occupant of the vehicle to an augmented reality viewer, wherein transmitted information is overlaid on an image of the vehicle rendered on the augmented reality viewer FIG. 1 is a block diagram an augmented reality (AR) apparatus 100 used in accordance with some embodiments. AR apparatus 100 includes a vehicle controller device 105 (also referred to simply as controller 105 or first controller device 105) coupled to or otherwise associated with a vehicle 110. For example, vehicle controller device 105 may be physically attached to vehicle 110 or communicatively coupled to vehicle 110. Vehicle 110 may be, for example, any public service or non-public service vehicle including cars, aircraft, fire engines and boats. Non-public service vehicles may be, for example, passenger vehicles, commercial vehicles or self-driving vehicles.

Vehicle controller device 105 is configured to receive vehicle information and information associated with one or more occupants of vehicle 110 and to transmit the received information to a remote AR viewer 115, wherein the transmitted information is overlaid on an image of vehicle 110 rendered on AR viewer 115. Examples of AR viewer 115 may include a human-worn device, for example, AR glasses, or an object-mounted device, for example, an AR viewer mounted on another vehicle or remote object. The object on which the object-mounted AR viewer is mounted are referred to herein as AR system 135.

The occupants of vehicle 110 may include the driver and passengers of vehicle 110. In cases where vehicle 110 is a self-driving vehicle, vehicle controller device 105 is configured to receive information associated with the passengers of vehicle 110. Information associated with one or more occupants of vehicle 110 that is received by vehicle controller device 105 may be at least one of identifying information, status information, experience information, and graphical information. Examples of identifying information may include the name or other identifier of an occupant of vehicle; examples of status information may include a license status, rank, duty status and department of the occupant; examples of experience information may include a skill and expertise of the occupant; and examples of graphical information may include one or more images associated with the occupant.

In order to obtain information associated with the occupants (not shown) of vehicle 110, vehicle controller device 105 is configured to connect with information devices 120 (for example, information devices 120a-120b), each of which is associated with an occupant. Each information device 120 may be any device capable of transmitting information and as such may be, for example, a smart phone, a radio, a Near Field Communication (NFC) tag, or a key fob. In an embodiment, vehicle controller device 105 and information device 120 may be wirelessly connected. Although vehicle controller device 105 and information device 120 may also be connected via wired connections.

Subsequent to an occupant entering vehicle 110, vehicle controller device 105 is configured to register at least one information device 120 associated with the occupant and query or otherwise receive information from the at least one information device 120 associated with the occupant. In an embodiment, the registration of at least one information device 120 associated with an occupant is automatic subsequent to the occupant entering vehicle 110, i.e., the registration does not require any action by the occupant. Subsequent to the occupant exiting vehicle 110, vehicle controller device 105 is also configured to un-register the at least one information device 120 associated with the exiting occupant. In un-registering the at least one information device 120 associated with the exiting occupant, vehicle controller device 105 may remove or delete the information received from the at least one information device 120 associated with the exiting occupant.

Vehicle controller device 105 is also configured to obtain information associated with vehicle 110. For example, vehicle controller device 105 may obtain location information or other system information of vehicle 110 from a vehicle tracking system or from other vehicle systems. Vehicle controller device 105 may also generate vehicle information. For example, based on the number of information devices 120 registered with vehicle controller device 105, vehicle controller device 105 may generate the number of current occupants in vehicle 110. Vehicle controller device 105 is configured to transmit the vehicle information along with information obtained from occupants of vehicle 110 to AR viewer 115, wherein the transmitted information is overlaid on an image of vehicle 110 rendered on AR viewer 115.

In an embodiment, vehicle controller device 105 is configured to access controller policy information, wherein the controller policy information is stored on vehicle controller device 105 or is otherwise accessible by vehicle controller device 105 from a data source communicatively coupled to vehicle controller device 105. The controller policy information may define or filter the type of information vehicle controller device 105 obtains from vehicle 110 and one or more occupants of vehicle 110 and transmits to AR viewer 115. The controller policy information may include information defining a relationship between a user of AR viewer 115, vehicle 110 and occupants of vehicle 110. As such, vehicle controller device 105 may use the controller policy information to determine the type of information a user of AR viewer 115 is authorized to receive from vehicle controller device 105.

Vehicle controller device 105 may also access occupant policy information from at least one information device 120 associated with each occupant of vehicle 110. The occupant policy information defines an occupant's preferences or profile, wherein the occupant's profile may indicate the type of information vehicle controller device 105 may receive from an associated information device 120 and transmit to AR viewer 115. Consider an example where vehicle controller device 105 is associated with a public safety vehicle and, based on the controller policy information accessed by vehicle controller device 105, vehicle controller device 105 determines that it may obtain status information and graphical information from the occupants of vehicle 110. In this example, vehicle controller device 105 may obtain the duty status and a graphical image from at least one information device 120 associated with each occupant of vehicle 110. The duty status information for each occupant may indicate, for example, if the occupant is on active duty, if the occupant is off-duty, if the occupant is in-pursuit, if the occupant is in a specialized unit, if the occupant has a specialized role, or if the occupant is in traffic patrol car parked on the road in a pull-over situation. The graphical image may be, for example, one or more avatars representing an assignment, incident, role, rank, or expertise of the occupant of vehicle 110. Consider further that in this example an occupant of vehicle 110 does not want vehicle controller device 105 to transmit the occupant's duty status because, for example, the occupant is involved in an undercover operation. The occupant policy information accessed by vehicle controller device 105 may therefore further filter the information vehicle controller device 105 obtains from the information device 120 associated with the undercover occupant. In this example, using the occupant policy information, vehicle controller device 105 may determine that it may obtain only the graphical information from the at least one information device 120 associated with the undercover occupant.

The controller policy information may further define the priority and order in which vehicle controller device 105 transmits information to AR viewer 115. Consider an example where vehicle 110 includes multiple occupants. The controller policy information may further define the priority or order in which vehicle controller device 105 transmits the occupants' information along with the vehicle information to AR viewer 115. In one example, based on the controller policy information, vehicle controller device 105 may transmit, to AR viewer 115, the occupants' information in a round-robin fashion along with the vehicle information. In another example, based on the controller policy information, vehicle controller device 105 may transmit one or more predefined occupants' information, for example, information for only the driver along with the vehicle information. The controller policy information and the occupant profile information may also include an enterprise profile, wherein the enterprise profile may indicate the type of information vehicle controller device 105 may receive from occupants of vehicle 110 associated with a given enterprise.

Vehicle controller device 105 is also configured to communicatively connect to a network 125. Subsequent to obtaining vehicle 110 information and information from at least one information device 120 associated with each occupant of vehicle 110, vehicle controller device 105 is configured to transmit the obtained vehicle and occupant information to network 125. In an embodiment, network 125 may be a cloud-based enterprise network or a social network. Network 125 is configured to store or otherwise access network policy information in order to further filter the type of information network 125 transmits to AR viewer 115 from vehicle controller device 105.

In an embodiment, the network policy information may include information defining a relationship between a user of AR viewer 115, vehicle 110 and occupants of vehicle 110. As such, network 125 may use the network policy information to determine the type of information a user of AR viewer 115 is authorized to receive from vehicle controller device 105. In order to receive information from vehicle controller device 105, AR viewer 115 may be configured to initially register with network 125. Thereafter, when vehicle controller device 105 transmits the vehicle and occupants information to network 125, network 125 may further transmit the vehicle and occupants information to AR viewer 115 based on the relationship defined in the network policy information and when vehicle 110 comes within a predefined proximity of AR viewer 115.

Network 125 may determine that vehicle 110 is within a predefined proximity of AR viewer 115 if, for example, vehicle 110 is within a predetermined distance from AR viewer 115, if vehicle 110 is within a field of view (or line of sight) of AR viewer 115, or if network 125 receives explicit indication, input or request from the user of AR viewer 115, especially when multiple AR viewers 115 are within a predetermined distance of vehicle 110 or within the field of view of vehicle 110. Consider an example where vehicle controller device 105 is a public safety vehicle. Depending on a role or authorization of an officer using AR viewer 115, using the network policy information, network 125 may transmit more or less vehicle and occupants information to AR viewer 115 when AR viewer 115 comes within the predefined proximity of vehicle 110.

Network 125 may be communicatively coupled to AR viewer 115 via an AR controller 130 (also referred to herein as a second controller) that is also communicatively coupled to AR viewer 115. When vehicle 110 comes within the predefined proximity of AR viewer 115, network 125 may transmit the obtained vehicle and occupant information from vehicle controller device 105 to AR viewer 115 via AR controller 130. For example, network 125 may transmit vehicle information including the location of vehicle 110 and number of occupants in vehicle 110 and occupant information including identifying information, status information, experience information and graphical information associated with each occupant of vehicle 110 to AR viewer 115 via AR controller 130. Network 125 may continue to transmit information obtained from vehicle controller device 105 to AR viewer 115 subsequent to the line of sight between AR viewer 115 and vehicle 110 becoming obstructed.

Figure 2:
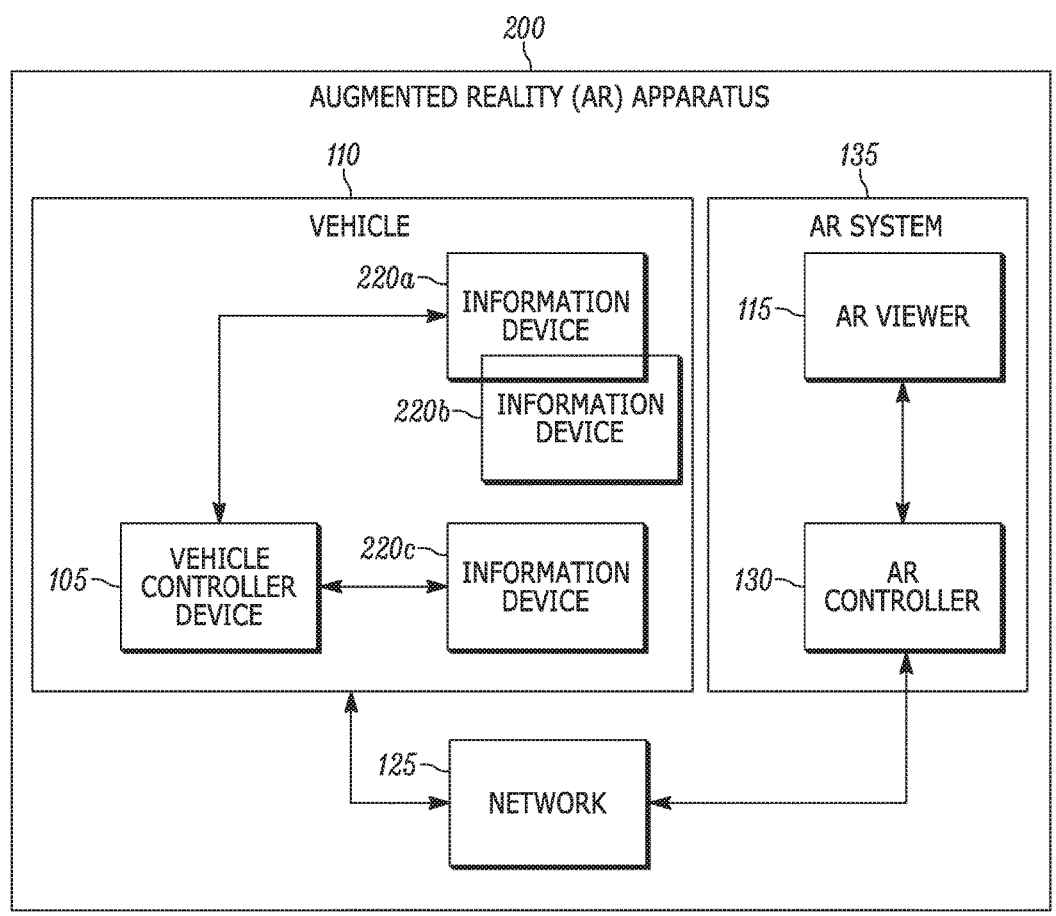
FIG. 2 is a further block diagram of the augmented reality apparatus used in accordance with some embodiments.

FIG. 2 is a further block diagram of the augmented reality apparatus 200 used in accordance with some embodiments. It should be noted that the augmented reality apparatus 200 includes similar components as those defined in FIG. 1 and FIG. 3. A vehicle controller device 105 associated with a vehicle 110 may be further configured to connect with information devices 220 (for example, information devices 220a-220c), wherein devices 220a and 220b are associated with a single occupant. In a case where an occupant has multiple information devices 220 (for example, information devices 220a and 220b), vehicle controller device 105 may use at least one of a controller policy information and an occupant policy information to determine whether to receive information from one or more of devices 220a and 220b associated with the occupant. In the case where the policy information indicates that vehicle controller device 105 may obtain information from multiple devices associated with the same occupant, the policy information may also indicate how to prioritize and transmit the information obtained from the multiple information devices 220 associated with the same occupant.

Figure 3:
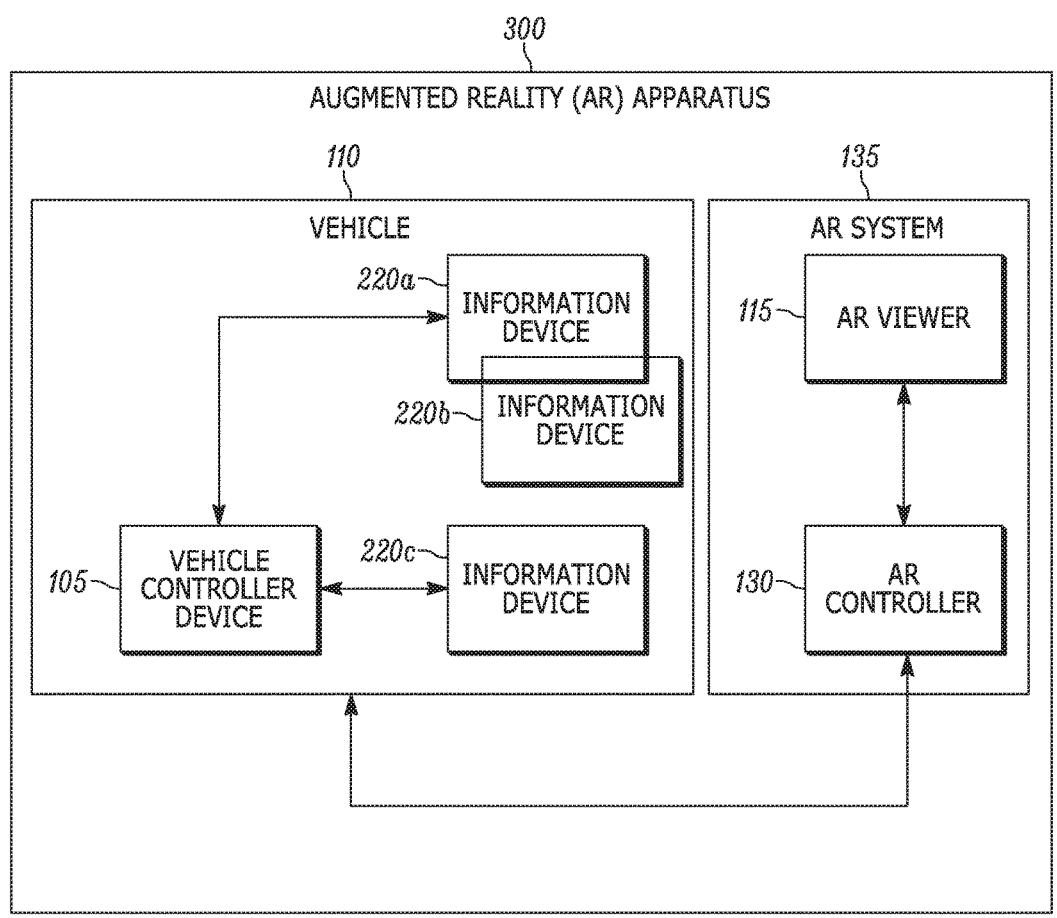
FIG. 3 is a further block diagram of the augmented reality apparatus used in accordance with some embodiments.

FIG. 3 is a further block diagram of the augmented reality apparatus 300 used in accordance with some embodiments. A vehicle controller device 105 associated with a vehicle 110 may be communicatively connected to an AR controller 130 associated with an AR viewer 115. When vehicle 110 enters a predefined proximity of AR system 135, for example a vehicle on which AR viewer 115 is mounted, AR controller device 130 may be configured to initially register with vehicle controller device 105. For instance, when vehicle 110 enters the line of sight of AR viewer 115, AR controller 130 may transmit a request to vehicle controller device 105, wherein the request may include a viewer profile of a user of AR viewer 115. The viewer profile may identify authorization information of the user of AR viewer 115. Using the controller and occupant policy information and the viewer profile, vehicle controller device 105 may subsequently transmit information associated with vehicle 110 and occupants of vehicle 110 to AR viewer 115 via AR controller 130. For example, vehicle controller device 105 may transmit, to AR viewer 115 via AR controller 130, vehicle information including the location of vehicle 110 and number of occupants in vehicle 110 and authorized occupant information that the user of AR viewer 115 is allowed to see, including identifying information, status information, experience information and graphical information associated with each occupant of vehicle 110. Vehicle controller device 105 may continue to transmit information to AR viewer 115 via AR controller 130, even if the line of sight between AR viewer 115 and vehicle 110 becomes obstructed.

Figure 4A:
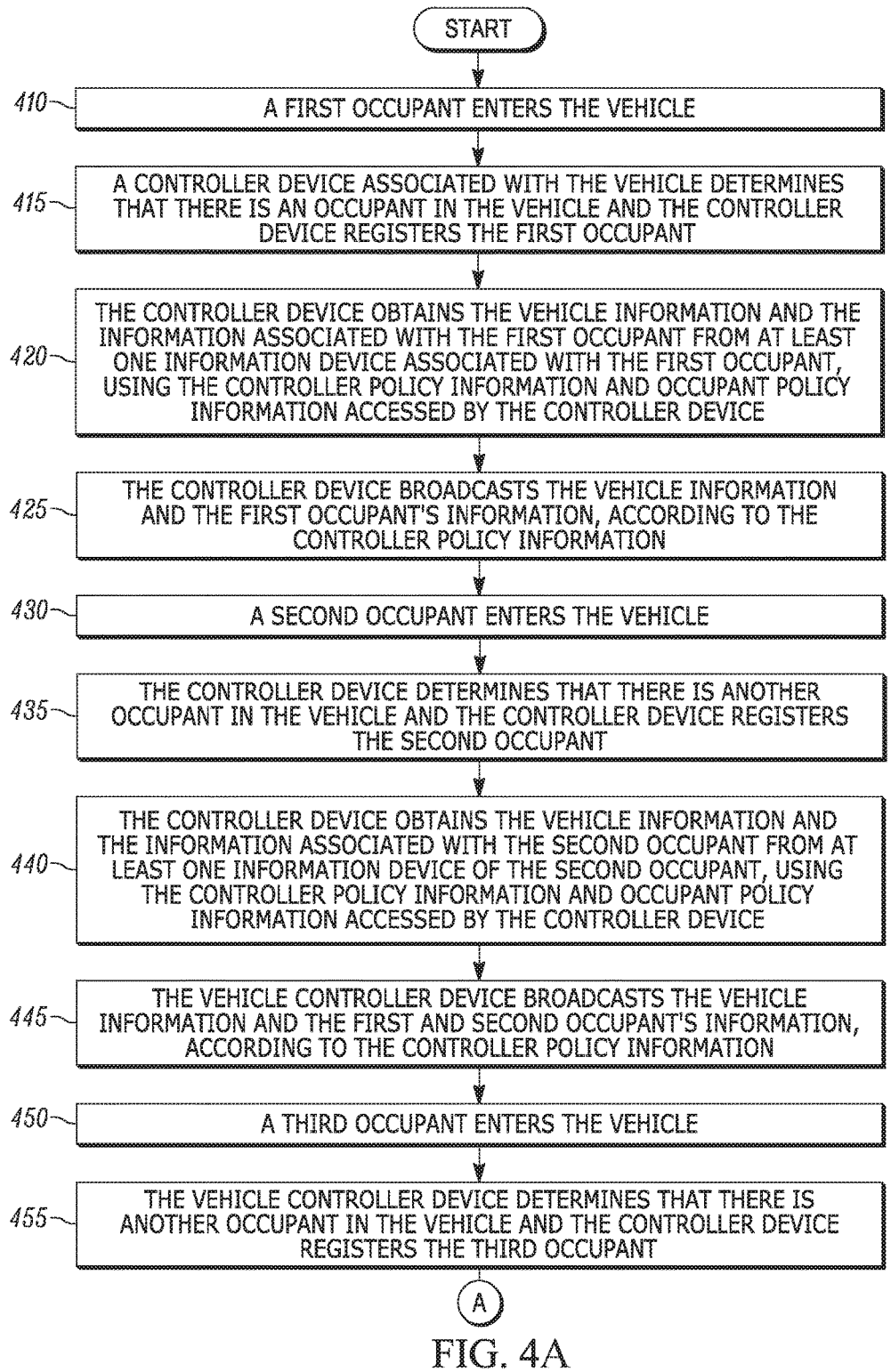
FIG. 4A and FIG. 4B show a flowchart of a method used in accordance with some embodiments.
Figure 4B:
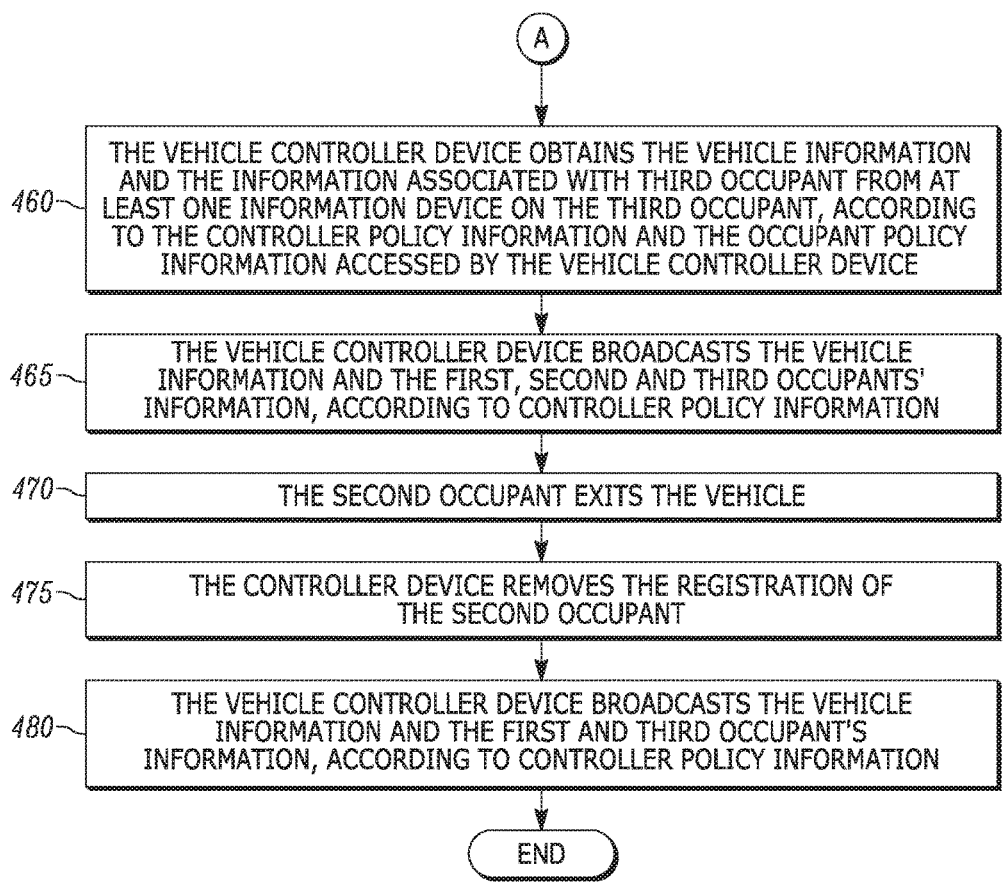

FIG. 4A and FIG. 4B show a flowchart of a method used in accordance with some embodiments. At 410, a first occupant enters a vehicle. At 415, a controller device associated with the vehicle determines that there is an occupant in the vehicle and the controller device registers the first occupant. At 420, the controller device obtains the vehicle information and information associated with the first occupant from at least one information device associated with the first occupant, using the controller policy information and occupant policy information accessed by the controller device. At 425, the controller device broadcasts the vehicle information and the first occupant's information, according to the controller policy information. At 430, a second occupant enters the vehicle. At 435, the controller device determines that there is another occupant in the vehicle and the controller device registers the second occupant. At 440, the vehicle controller device obtains the vehicle information and the information associated with the second occupant from at least one information device of the second occupant, using the controller policy information and occupant policy information accessed by the controller device. At 445, the vehicle controller device broadcasts the vehicle information and the first and second occupants' information, according to controller policy information. At 450, a third occupant enters the vehicle. At 455, the vehicle controller device determines that there is another occupant in the vehicle and the controller device registers the third occupant. At 460, the vehicle controller device obtains the vehicle information and the information associated with third occupant from at least one information device of the third occupant, according to the controller policy information and the occupant policy information accessed by the vehicle controller device. At 465, the vehicle controller device broadcasts the vehicle information and the first, second and third occupants' information, according to controller policy information. At 470, the second occupant exits the vehicle. At 475, the controller device removes the registration of the second occupant. At 480, the vehicle controller device broadcasts the vehicle information and the first and third occupant's information, according to controller policy information.

Figure 5:
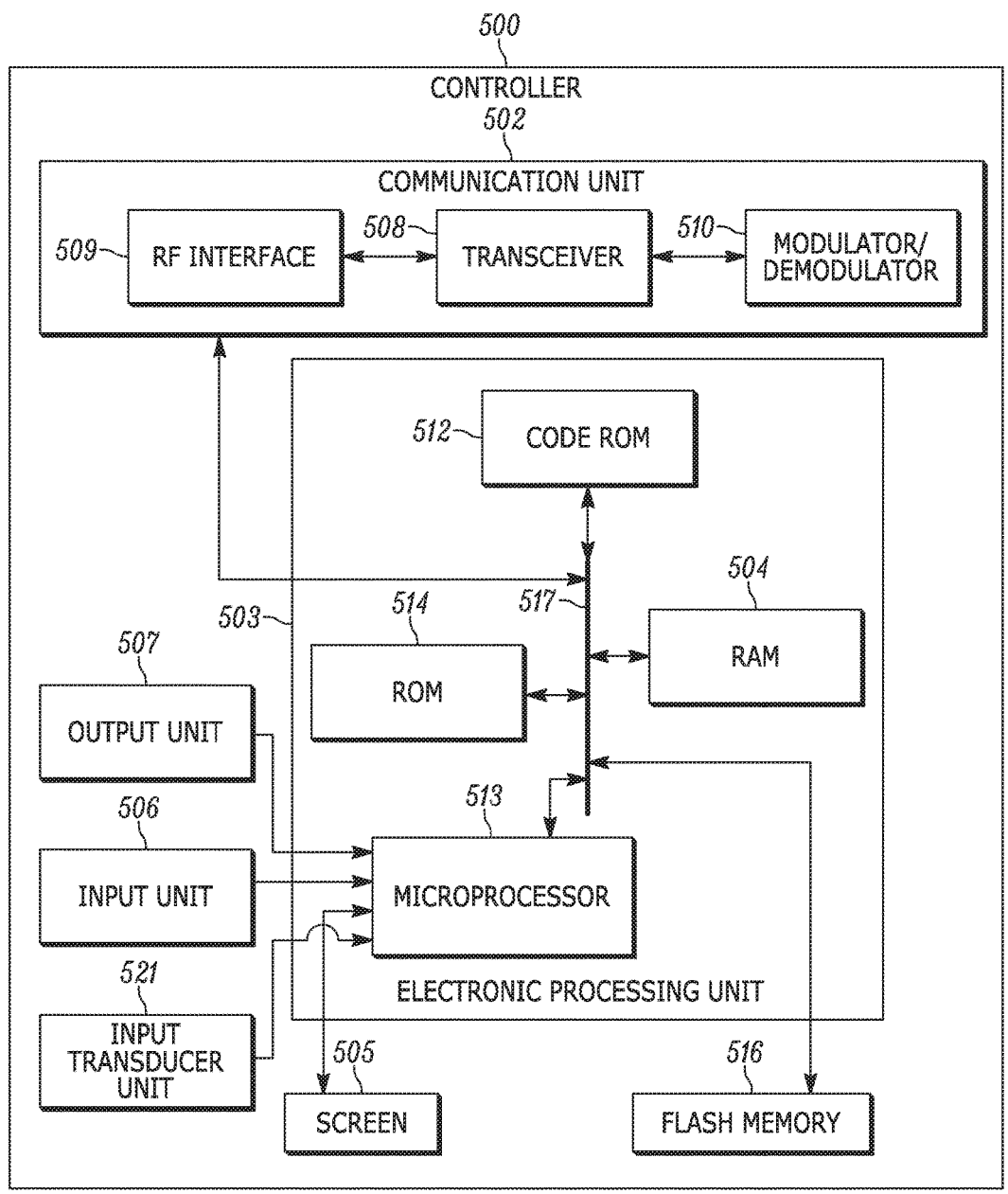
FIG. 5 is a block diagram of a controller used in accordance with some embodiments.

FIG. 5 is a block diagram of a controller 500, such as controller devices 105 and 130 of FIGS. 1-3, used in accordance with some embodiments. Controller 500, for example, may include a communications unit 502 coupled to a common data and address bus 517 of an electronic processor 503 (also referred to as the electronic processing unit 503). Controller 500 may also include an input unit (e.g., keypad, pointing device, etc.) 506, an output transducer unit (e.g., speaker) 507, an input transducer unit (e.g., a microphone) (MIC) 521, and a display screen 505, each coupled to be in communication with the electronic processor 503.

The electronic processor 503 may include a code read-only memory (ROM) 512 for storing data for initializing system components of controller 500. The electronic processor 503 may further include a microprocessor 513 coupled, by the common data and address bus 517, to one or more memory devices, such as a read only memory (ROM) 514, a random access memory (RAM) 504, and/or a static memory or flash memory 516. One or more of ROM 514, RAM 504 and flash memory 516 may be included as part of electronic processor 503 or may be separate from, and coupled to, the electronic processor 503.

Communications unit 502 may include an RF interface 509 configurable to communicate with network components and other user equipment within its communication range. Communications unit 502 may include one or more broadband and/or narrowband transceivers 508, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 502 may also include one or more local area network or personal area network transceivers perhaps operating in accordance with an IEEE 802.11 standard (e.g., 802.11a, 802.11b, 802.11g), or a Bluetooth transceiver. The transceivers may be coupled to a combined modulator/demodulator 510. The one or more memory devices 512, 514 and 516 are configured to store non-transitory computer-executable instructions to perform a set of functions such as one or more of the steps set forth in FIG. 4A, FIG. 4B, FIG. 6 and FIG. 7.

Figure 6:
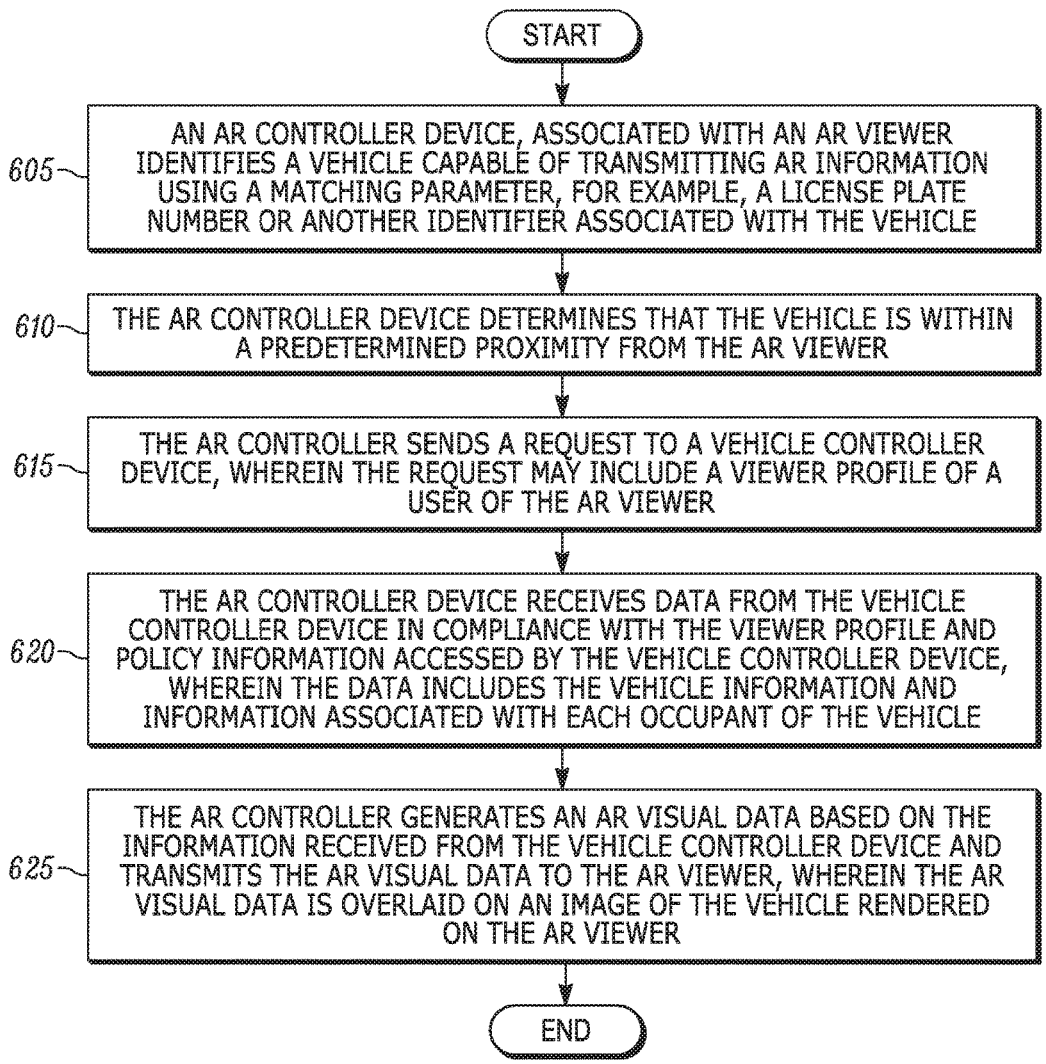
FIG. 6 is a flowchart of a method used in accordance with some embodiments.

FIG. 6 is a flowchart of a method used in accordance with some embodiments. At 605, an AR controller device, associated with an AR viewer, identifies a vehicle capable of transmitting AR information using a matching parameter, for example, a license plate number or another identifier associated with the vehicle. At 610, the AR controller device determines that the vehicle is within a predetermined proximity from the AR viewer. At 615, the AR controller transmits a request to a vehicle controller device, wherein the request may include a viewer profile of a user of the AR viewer. At 620, the AR controller device receives data from the vehicle controller device in compliance with the viewer profile and policy information accessed by the vehicle controller device, wherein the data includes the vehicle information and information associated with each occupant of the vehicle. At 625, the AR controller generates an AR visual data based on the information received from the vehicle controller device and transmits the AR visual data to the AR viewer, wherein the AR visual data is overlaid on an image of the vehicle rendered on the AR viewer.

Figure 7:
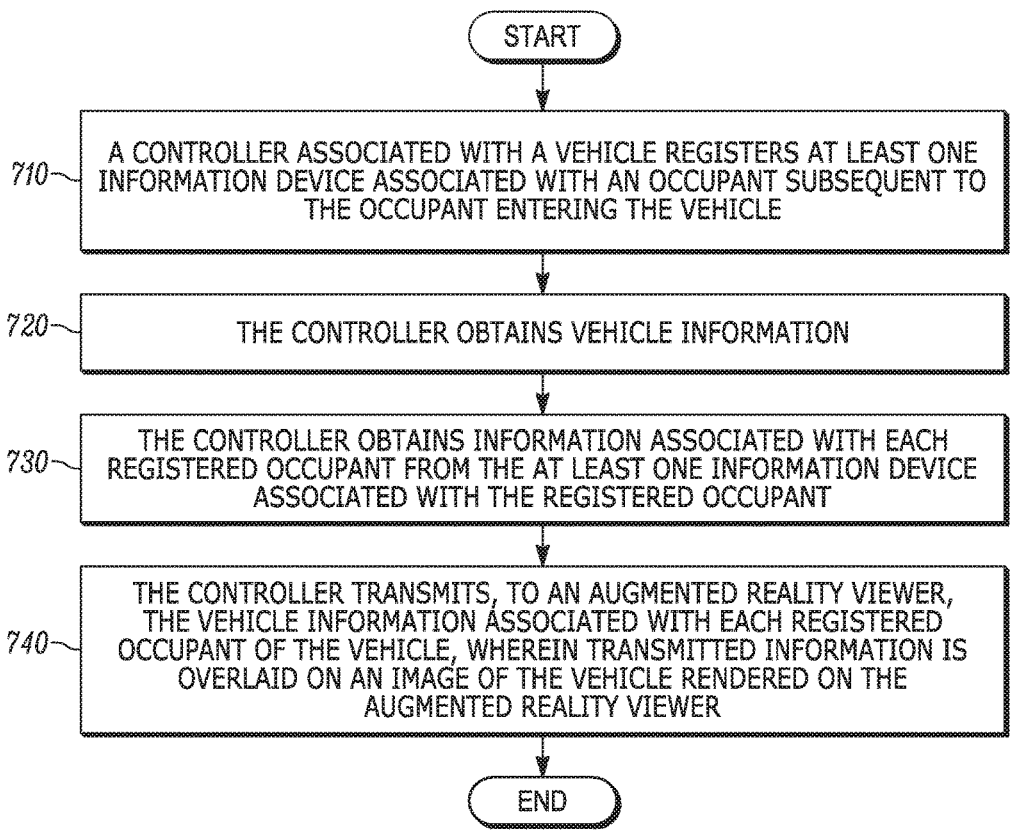
FIG. 7 is a flowchart of a method used in accordance with some embodiments.

FIG. 7 is a flowchart of a method used in accordance with some embodiments. At 710, a controller associated with a vehicle registers at least one information device associated with an occupant subsequent to the occupant entering the vehicle. At 720, the controller obtains vehicle information. In an embodiment, the obtained information may include information generated by the controller. At 730, the controller obtains information associated with each registered occupant from the at least one information device associated with the registered occupant. At 740, the controller transmits, to an augmented reality viewer, the vehicle information and information associated with each registered occupant of the vehicle, wherein transmitted information is overlaid on an image of the vehicle rendered on the augmented reality viewer.

The AR apparatus therefore may enable public safety officers to visually scan public safety vehicles to locate fellow officers with the same role, department, expertise, etc. when there are multiple public safety vehicles at an incident. In some instances, the AR apparatus may enable public safety officers to obtain information from public safety vehicles quicker than through a radio call. The AR apparatus may also enable public safety officers observing another public safety vehicle (moving or stopped) to quickly obtain essential information on the occupants in the observed public safety vehicle. For example, the observing public safety officer may be able to obtain information such as the status/role of the occupants of the observed vehicle (for example, the patrol type of the occupants of the observed vehicle, the duty status of the occupants of the observed vehicle (for example, whether the observed occupant is off-duty or on-duty), the unit of the observed occupant (for example, narcotics unit), and/or the rank of the observed occupant (for example, detective or captain)), the name, expertise and/or rank of the observed public safety officer.

In a pull-over scenario, the AR apparatus may also be used to visually identify the occupants of a stopped vehicle to determine, for example, the number of occupants in the stopped vehicle and/or the identifiers for the occupants in the stopped vehicle, before the vehicle is approached. Jurisdictions using the AR system may also require that drivers' license information such as a student driver status, a restricted license status, or a suspended license status be shared with public safety officers and/or the public-at-large to improve road safety. Traffic officers may also use the AR apparatus to scan vehicles in a highway car pool lane to ensure that a multi-passenger requirement is met.

Non-public safety occupants may also use the AR apparatus to share personal information such as medical information (for example, blood type, allergies and/or known illness) that may be accessed by emergency personnel after an incident. Non-public safety occupants may also use the AR apparatus to project a personalized appearance of the vehicle being ridden by the non-public safety occupants. For example, a passenger in an autonomous (self-driving) car pick-up service may use the AR apparatus to transmit a sport team logo or another avatar to AR viewers. In another example, generic, autonomous, or car pick up services may use the AR apparatus to project each passenger's desired image.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing public safety officer information in an augmented reality environment, the method comprising:
   registering, by a first controller associated with a public service vehicle, at least one information device associated with an occupant subsequent to the occupant entering the public service vehicle;
   obtaining, by the first controller, vehicle information;
   obtaining, by the first controller, information associated with each registered occupant from at least one information device associated with the registered occupant, wherein the information associated with the registered occupant includes a duty status associated with the registered occupant, the registered occupant being a public safety officer, wherein the duty status comprises one or more of whether the registered occupant is off-duty, on-duty, in-pursuit or in an undercover operation; and
   transmitting, by the first controller to an augmented reality viewer, the vehicle information and the information associated with each registered occupant of the public service vehicle, wherein the transmitted information is overlaid on an image of the public service vehicle rendered on the augmented reality viewer.

2. The method of claim 1, wherein the registering comprises wirelessly connecting the first controller with at least one information device associated with each registered occupant of the public service vehicle.

3. The method of claim 1, wherein the transmitting further comprises:
   transmitting, by the first controller, the vehicle information and the information associated with each registered occupant of the public service vehicle to a second controller associated with the augmented reality viewer.

4. The method of claim 1, wherein the transmitting further comprises:
   determining that the public service vehicle is within a predefined proximity of the augmented reality viewer; and
   transmitting, by the first controller to the augmented reality viewer, the vehicle information and the information associated with each registered occupant of the public service vehicle.

5. The method of claim 1, wherein the transmitting further comprises:
   determining that the public service vehicle is within a predefined proximity of the augmented reality viewer; and
   transmitting, by the first controller to the augmented reality viewer, the vehicle information and the information associated with each registered occupant of the public service vehicle subsequent to a line of sight between the public service vehicle and the augmented reality viewer becoming obstructed.

6. The method of claim 1, further comprising:
   determining when an exiting occupant leaves the public service vehicle;
   deleting, by the first controller, a registration of the exiting occupant subsequent to the exiting occupant leaving the public service vehicle; and removing, by the first controller, information associated with the exiting occupant from information transmitted to the augmented reality viewer.

7. The method of claim 1, wherein the vehicle information transmitted to the augmented reality viewer is used to track the public service vehicle when the public service vehicle is within a predefined proximity of the augmented reality viewer.

8. The method of claim 1, further comprising filtering the information associated with the registered occupant based on whether the registered occupant is involved in the undercover operation.

9. The method of claim 1, wherein the information associated with the registered occupant further includes experience information.

10. A controller device for providing public safety officer information in an augmented reality environment, the controller device comprising:
 a memory storing computer-executable instructions;
 a transceiver; and
 an electronic processor configured to perform a set of functions in response to executing the computer-executable instructions, the set of functions including:
  registering, by the controller device associated with a public service vehicle, at least one information device associated with an occupant subsequent to the occupant entering the public service vehicle;
  obtaining, by the controller device, vehicle information;
  obtaining, by the controller device, information associated with each registered occupant from at least one information device associated with the registered occupant, wherein the information associated with the registered occupant includes a duty status associated with the registered occupant, the registered occupant being a public safety officer, wherein the duty status comprises one or more of whether the registered occupant is off-duty, on-duty, in-pursuit or in an undercover operation; and
  transmitting, by the controller device to an augmented reality viewer, the vehicle information and the information associated with each registered occupant of the public service vehicle, wherein the transmitted information is overlaid on an image of the public service vehicle rendered on the augmented reality viewer.

11. The controller device of claim 10, further configured to wirelessly connect with at least one information device associated with each registered occupant of the public service vehicle.

12. The controller device of claim 10, further configured to transmit the vehicle information and the information associated with each registered occupant of the public service vehicle to another controller associated with the augmented reality viewer.

13. The controller device of claim 10, further configured to:
 determine that the public service vehicle is within a predefined proximity of the augmented reality viewer; and
 transmit, to the augmented reality viewer, the vehicle information and the information associated with each registered occupant of the public service vehicle.

14. The controller device of claim 10, further configured to:
 determine when an exiting occupant leaves the public service vehicle
 delete a registration of the exiting occupant subsequent to the exiting occupant leaving the public service vehicle; and
 remove information associated with the exiting occupant from information transmitted to the augmented reality viewer.

15. The controller device of claim 10, wherein the set of functions further include filtering the information associated with the registered occupant based on whether the registered occupant is involved in the undercover operation.

16. The controller device of claim 10, wherein the information associated with the registered occupant further includes experience information.

17. An augmented reality controller associated with an augmented reality viewer, the augmented reality controller for providing public safety officer information in an augmented reality environment, the augmented reality controller comprising:
 a memory storing computer-executable instructions;
 a transceiver; and
 an electronic processor configured to perform a set of functions in response to executing the computer-executable instructions, the set of functions including:
  identifying a public service vehicle capable of transmitting augmented reality information;
  determining that the public service vehicle is within a predetermined proximity from the augmented reality viewer;
  transmitting a request to a vehicle controller device associated with the public service vehicle, wherein the request includes a viewer profile of a user of the augmented reality viewer;
  receiving data from the vehicle controller device in compliance with the viewer profile and policy information accessed by the vehicle controller device, the data received from the vehicle controller device including information associated with each occupant of the public service vehicle including a duty status associated with each occupant, each occupant being a public safety officer, wherein the duty status comprises one or more of whether each occupant is off-duty, on-duty, in-pursuit or in an undercover operation, and wherein the information associated with each occupant is obtained by the vehicle controller device from an information device associated with each occupant;
  generating augmented reality visual data based on the data received from the vehicle controller device; and
  transmitting the augmented reality visual data to the augmented reality viewer, wherein the augmented reality visual data is overlaid on an image of the public service vehicle rendered on the augmented reality viewer.

18. The augmented reality controller of claim 17, wherein the determining comprises using a matching parameter associated with the public service vehicle to determine that the public service vehicle is within the predetermined proximity from the augmented reality viewer.

19. The augmented reality controller of claim 17, wherein the set of functions further include filtering the information associated with each occupant based on whether each occupant is involved in the undercover operation.

20. The augmented reality controller of claim 17, wherein the information associated with each occupant further includes experience information.

* * * * *